(12) United States Patent
Wilson

(10) Patent No.: US 7,824,144 B2
(45) Date of Patent: Nov. 2, 2010

(54) COMPACT SYSTEM FOR LIFTING AND MOVING A PRESSURIZED TANK

(75) Inventor: Michael R. Wilson, Winnsboro, TX (US)

(73) Assignee: Wilcole, Inc., Winnsboro, TX (US)

( * ) Notice: Subject to any disclaimer, the term of this patent is extended or adjusted under 35 U.S.C. 154(b) by 0 days.

(21) Appl. No.: 12/509,194

(22) Filed: Jul. 24, 2009

(65) Prior Publication Data

US 2009/0285659 A1 Nov. 19, 2009

Related U.S. Application Data

(63) Continuation of application No. 11/424,184, filed on Jun. 14, 2006.

(51) Int. Cl.
*B66F 9/18* (2006.01)
(52) U.S. Cl. ............... 414/421; 414/444; 414/622; 294/68.26; 280/47.15; 248/139
(58) Field of Classification Search ............... 414/420, 414/421, 444, 622; 294/68.26; 280/47.15; 254/199, 250, 262; 248/139, 312
See application file for complete search history.

(56) References Cited

U.S. PATENT DOCUMENTS

| | | | |
|---|---|---|---|
| 2,730,257 A | 1/1956 | Stresau, Jr. | |
| 3,868,033 A * | 2/1975 | Le Duff | 414/648 |
| 4,832,294 A * | 5/1989 | Eidem | 248/125.8 |
| 5,178,508 A * | 1/1993 | Tauer | 414/420 |
| 5,207,550 A | 5/1993 | Lehman | |
| 5,210,901 A * | 5/1993 | Cooper | 15/302 |
| 5,257,890 A * | 11/1993 | Vickary | 414/420 |
| 5,344,278 A | 9/1994 | Emig, Jr. | |
| 5,618,154 A | 4/1997 | Irons et al. | |
| 5,658,118 A | 8/1997 | Luca | |
| 6,406,248 B1 * | 6/2002 | McGill et al. | 414/634 |
| 2002/0076313 A1 | 6/2002 | Vartanian, Sr. | |
| 2004/0075088 A1 * | 4/2004 | Rard | 254/199 |

* cited by examiner

*Primary Examiner*—Michael S Lowe
(74) *Attorney, Agent, or Firm*—Gardere Wynne Sewell LLP

(57) ABSTRACT

A hoist with a cradle for coupling with a pressurized tank. A primary means of restraining the tank on the cradle is provided along with a backup means should the primary means fail for any reason. A linear actuator assembly raises the cradle up to 27 inches from the floor surface. An onboard battery with an integrated battery charger provides power to the linear actuator. A compact base with swivel casters allows a raised tank to be safely lifted and transported by a single operator. The compact size of the hoist allows it to operate in confined spaces.

11 Claims, 3 Drawing Sheets

COMPACT SYSTEM FOR LIFTING AND MOVING A PRESSURIZED TANK

CROSS-REFERENCES TO RELATED APPLICATIONS

This application is a continuation of co-pending application Ser. No. 11/424,184, filed Jun. 14, 2006, which is incorporated by reference herein in its entirety.

BACKGROUND OF THE INVENTION

1. Field of the Invention

The present invention relates generally to an apparatus for lifting and moving pressurized tanks and more particularly relates to a compact apparatus for lifting and moving heavy pressurized oxygen tanks to assist in their installation in and removal from EMS response vehicles.

2. Description of Related Art

Pressurized oxygen cylinders are standard equipment onboard most ambulances and other EMS response vehicles. Most of the pressurized cylinders used are made from either aluminum or steel. Though a lightweight material, an empty aluminum pressurized oxygen cylinder can weigh over one hundred pounds. Steel cylinders are heavier yet.

The Occupational Safety and Health Administration (OSHA) does not have a standard which sets limits on how much a person may lift or carry. However, a sister agency, the National Institute for Occupational Safety and Health (NIOSH), has developed a mathematical model which helps predict the risk of injury based on the weight being lifted and accounts for many confounding factors. The model is based on previous medical research into the compressive forces needed to cause damage to bones and ligaments of the back.

NIOSH has shown through research that a lifting index greater than 3.0 can clearly be linked to an increased risk of back and other injuries. In applying the NIOSH equation for calculating a lifting index, an EMS worker lifting a one hundred pound pressurized oxygen tank from the floor and stowing it in a compartment of an ambulance would likely encounter a lifting index of 3.9 or higher. A heavier tank would increase this number even more. Because of this, a single EMS worker attempting to lift and move such a cylinder faces a significant risk of back injury.

Cylinder storage compartments onboard EMS vehicles tend to be quite small, some barely larger than the cylinders themselves. These cramped spaces further compound the dangers faced by an EMS worker faced with the task of changing out cylinders. Because the spaces are so small, only one worker can realistically fit within the compartment to manipulate the cylinders.

Potential back injury is not the only possible hazard associated with pressurized tanks. The cylindrical shape makes them difficult to grasp and awkward to handle by a single person. However, due to the cramped compartment in which they are stored, only one person can realistically be expected to handle the cylinders. Thus, a real danger exists that a pressurized cylinder being handled could fall from a vehicle unexpectedly. If the cylinder were to strike an object with the exposed valve, the cylinder might rupture. A ruptured cylinder can explode with tremendous force or even become a missile that can cause significant damage to anything it impacts.

BRIEF SUMMARY OF THE INVENTION

In light of the difficulties faced with lifting and moving pressurized tanks, it is one object of the present invention to provide an apparatus that can safely and efficiently lift, support, and control a pressurized tank during transport.

It is yet another objective of the present invention to provide an apparatus that can be easily maneuvered by a single operator under all load conditions.

It is yet another objective of the present invention to provide an apparatus that is simple to operate.

It is yet another objective of the present invention to provide an apparatus that is compact in size to allow easy manipulation of tanks within the confines of ambulance stowage compartments.

In accordance with a preferred embodiment of the present invention, a battery-powered electric hoist is, provided that incorporates a tank cradle for firmly and safely restraining a pressurized tank for transport. The hoist incorporates an electric linear actuator that can raise the tank to the desired height of an ambulance stowage compartment. Large swivel casters are also provided to allow for easy movement of the hoist and attached tank by a single operator. In addition, the tank cradle and base are compact in size to allow for easy maneuverability. This affords greater ease in inserting and removing a pressurized tank from the cramped stowage compartments of an ambulance.

The invention accordingly comprises the features described more fully below, and the scope of the invention will be indicated in the claims. Further objects of the present invention will become apparent in the following detailed description read in light of the drawings.

BRIEF DESCRIPTION OF THE SEVERAL VIEWS OF THE DRAWING(S)

The present invention will be more fully understood by reference to the following detailed description of the preferred embodiments of the present invention when read in conjunction with the accompanying drawings, in which like reference numerals refer to like parts throughout the views, wherein.

Figure 1:
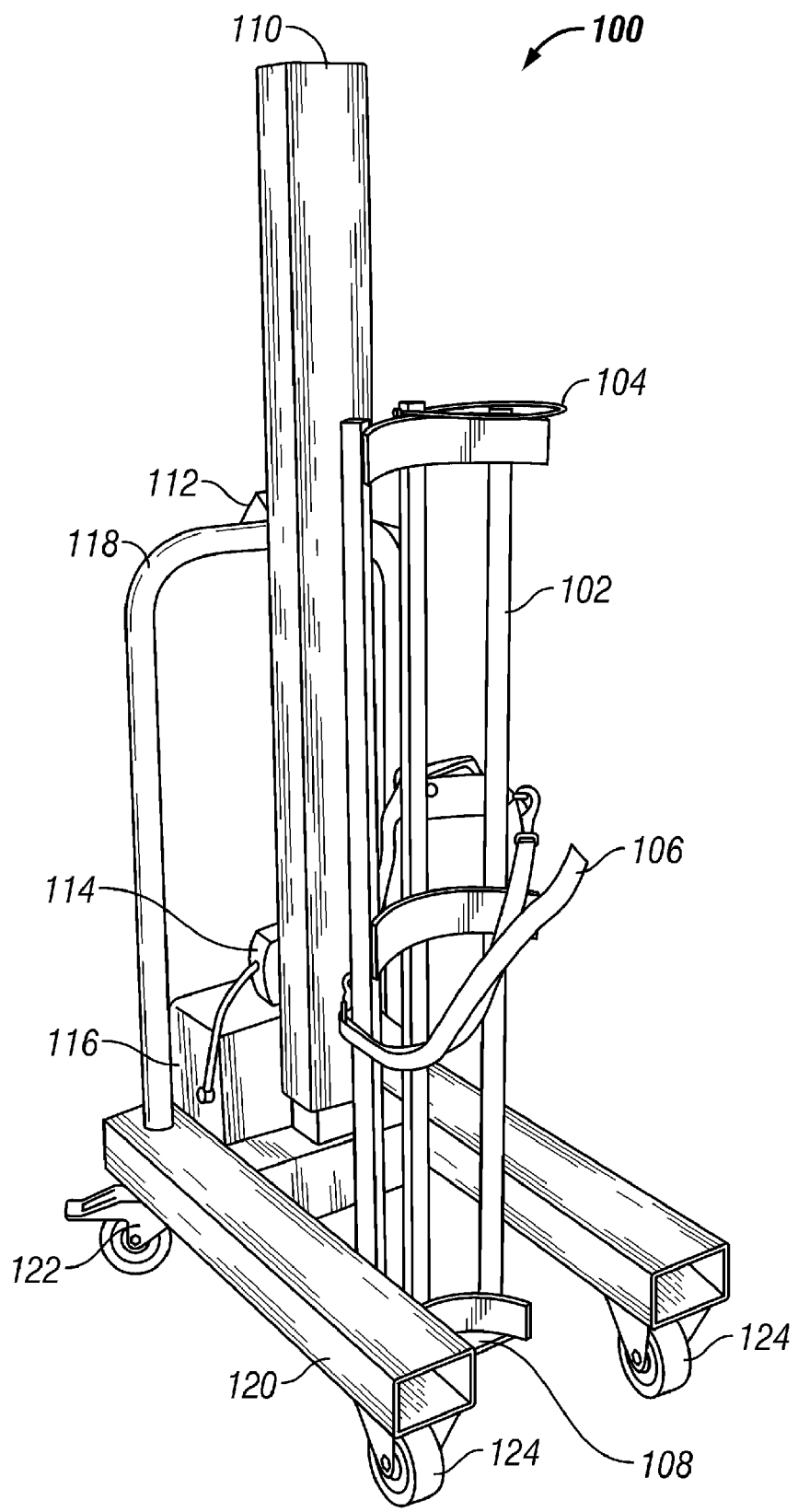
FIG. 1 is a perspective view of an embodiment of the present invention.

Where used in the various figures of the drawing, the same reference numbers designate the same or similar parts. Furthermore, when the terms "top," "bottom," "first," "second," "upper," "lower," "height," "width," "length," "end," "side," "horizontal," "vertical," and similar terms are used herein, it should be understood that these terms have reference only to the structure shown in the drawing and are utilized only to facilitate describing the invention.

All figures are drawn for ease of explanation of the basic teachings of the present invention only; the extensions of the figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

REFERENCE NUMERALS 100 hoist
102 cradle
104 safety ring
106 strap
108 lip
110 linear actuator assembly
112 height switch
114 battery charger
116 battery
118 handle
120 base
122 swivel caster
124 fixed caster

DETAILED DESCRIPTION OF THE INVENTION

Figure 2:
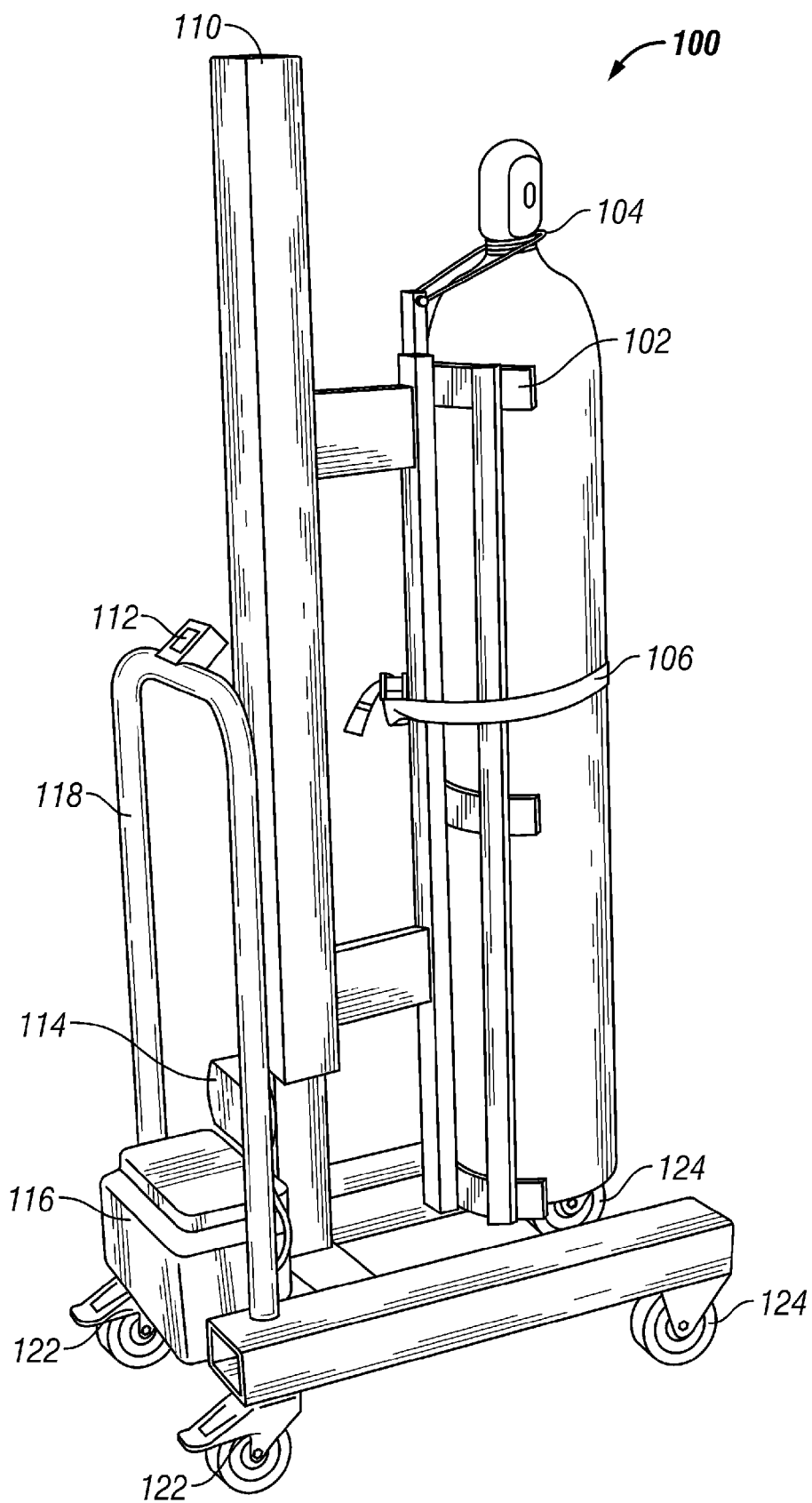
FIG. 2 is a perspective view of an embodiment of the present invention with a pressurized tank attached to the cradle for transport.

FIG. 1 and FIG. 2 illustrate a hoist 100 according to one embodiment of the present invention. FIG. 1 shows the hoist 100 without a pressurized tank attached to its cradle 102. FIG. 2 shows the hoist 100 with a pressurized tank attached to its cradle 102 and lifted for transport. The hoist 100 features a tank cradle 102 for securely attaching a pressurized cylindrical tank and supporting it during transport. The cradle 102 is attached to a linear actuator assembly 110 that provides vertical lifting motion to the cradle 102. The electrical power for the linear actuator comes from a 24V battery 116 that features its own trickle battery charger 114. The linear actuator assembly 110 is attached to a narrow base 120 that features heavy duty casters on its four corners. The front of the base 120 features fixed casters 124 while the rear features swivel casters 122 to allow for easy steering and maneuverability.

The major structural components of the hoist 100 are constructed from steel. Steel was chosen because it is inexpensive, easy to fabricate, structurally stable, and readily available. However, a person having ordinary skill in the art of fabrication would realize that other metals such as aluminum or even materials such as polymer composites may be used depending upon the structural load requirements. Lighter materials may make the hoist 100 easier to maneuver due to the lighter weight. However, the tradeoff may be in increased cost and reduced stability of a fully-loaded device. Steel provides a good balance of cost, stability, and maneuverability.

With reference to FIG. 1 and FIG. 2, the hoist 100 according to the present embodiment features a narrow base 120 with swivel casters 122 for increased maneuverability. The base 120 is fabricated such that there is a center opening between two outer rails. The center opening is just wide enough to allow for a pressurized cylinder to fit between the rails for attachment to the tank cradle 102. The base 120 also features an attached handle 118. The handle 118 allows an operator to maintain a comfortable grip on the hoist 100 while maintaining proper control under a full load. The forward edge of the outer rails of the base 120 feature fixed casters 124 while the rearward edge of the rails feature swivel casters 122. The swivel casters 122 are located essentially beneath the operator's handle 118 to allow the hoist 100 to be easily steered into position even with a load attached. In addition, the swivel casters 122 also feature locking mechanisms to allow a fully-loaded hoist 100 to be safely parked.

While the current embodiment provides four casters for maximum stability, other configurations are possible and are within the scope of the present invention. For example, in another embodiment all four of the casters could swivel. In yet another embodiment, the base 120 could utilize only three casters; two on the forward ends of the outer rails of the base 120 nearest the tank opening and one swivel caster on the opposite end of the base 120, located in the center approximately beneath the linear actuator 110. Utilizing only three casters would improve the maneuverability of the hoist 100 but at the same time would sacrifice some of the vertical stability.

With reference to FIG. 1 and FIG. 2, the hoist 100 according to the present embodiment features a tank cradle 102 that is shaped to wrap partially around a pressurized tank for support. The radius of the curve of the cradle 102 approximates the radius of the body section of the pressurized tank. The cradle 102 also extends vertically to the approximate height of the body portion of a full-sized pressurized tank. Thus, because its height is suitable for the tallest tank, the cradle 102 can support essentially any sized pressurized tank.

With reference to FIG. 1 and FIG. 2, the cradle 102 features a lip 108 near the bottom that engages the base of a pressurized tank that is to be attached to the cradle 102. To attach a tank, the lip 108 is brought into contact with the base of the tank. The tank is then tipped slightly away from the lip 108 so that the lip 108 can slide beneath the tank. Once the tank rests on the lip 108, the primary and backup attachment means can be utilized to restrain the tank within the confines of the cradle 102.

With reference to FIG. 1 and FIG. 2, the primary attachment means provided in the present embodiment is a strap 106 with an adjustable side release buckle. The strap 106 is wrapped around the body of the tank and the side release buckle is engaged and adjusted to put tension on the strap 106 to restrain the tank within the cradle 102. While the present embodiment utilizes a strap 106 for the primary attachment means, other embodiments could utilize chain, rope, or cable. Also, a strap with a ratchet tightening mechanism, a belt-type buckle, or a hook and loop fastener could be used in place of the adjustable side release buckle for maintaining proper tension on the strap 106.

With reference to FIG. 1 and FIG. 2, the backup attachment means provided in the present embodiment is a safety ring 104. The safety ring 104 is designed to provide backup retention of the tank in the cradle 102 should the strap 106 inadvertently release. In the present embodiment, the safety ring 104 is constructed of plastic coated steel cable. The steel cable provides tensile strength while the plastic coating prevents the cable from scratching or marring the finish of a tank. While the present embodiment utilizes plastic coated steel cable for the safety ring 104, other embodiments could utilize uncoated steel cable, chain, rope, or even strap.

The safety ring 104 is threaded through a piece of tubular steel that fits within the center piece of slightly larger diameter tubular steel that makes up the framework of the cradle 102. Thus, the safety ring 104 can be lifted by raising the attached piece of tubular steel to a height that allows the safety ring 104 to slip easily over the tank's valve portion. When released, the tubular steel attached to the safety ring 104 slips down within the larger center piece of tubular steel that makes up the framework of the cradle 102. This allows the safety ring 104 to be rapidly installed and removed.

The hoist 100 according to the present embodiment features a linear actuator assembly 110 that is attached to both the cradle 102 and base 120. The linear actuator 110 uses electrical power from the 24V battery 116 to operate. The height switch 112 allows the linear actuator to extend and raise the tank cradle 102 with attached tank up to 27 inches above the floor surface. This height is sufficient for insertion of a tank into typical ambulance stowage compartments. A second position of the height switch 112 allows the linear actuator 110 to retract and thus return the cradle 102 to the floor level.

Power for the linear actuator 110 comes from a rechargeable 24V battery 116. The hoist 100 also features a built-in trickle charger 114 to allow the hoist 100 to be plugged into a standard wall socket and recharged when not in use. Battery power is utilized to prevent the need for an electrical cord to provide power to operate the hoist 100. This increases the devices portability and maneuverability. While the present embodiment utilizes a 24V power source, other voltages may be substituted as determined by the voltage requirements of the linear actuator 110 mechanism.

Figure 3:
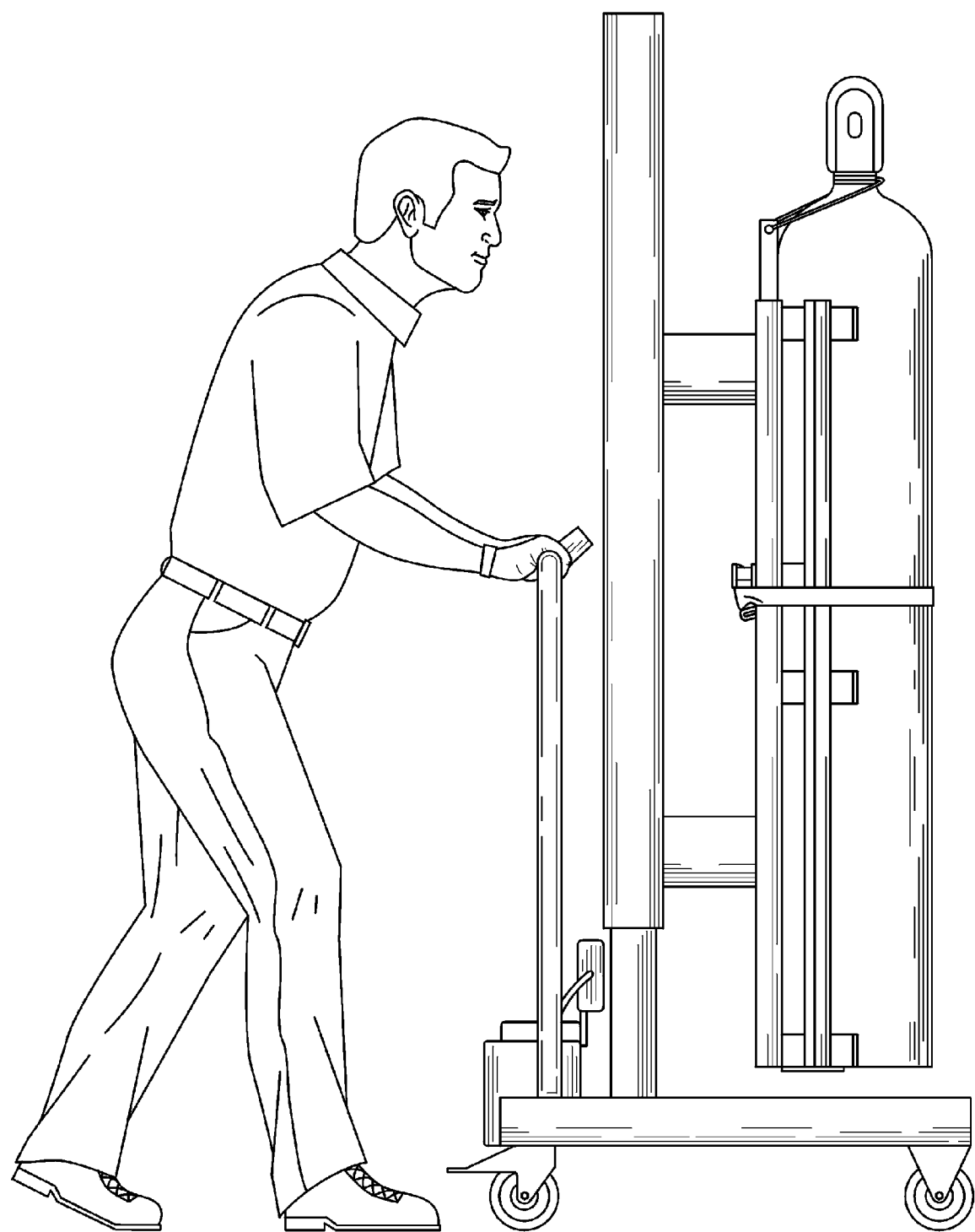
FIG. 3 is a side-facing illustration of an embodiment of the present invention with a pressurized tank in position for transport.

FIG. 3 shows a hoist 100 being used by an operator 300 to transport a pressurized tank 302. The operator 300 maneuvers the hoist 100 by utilizing the handle 118. Once in position, the hoist 100 can be parked by locking the swivel casters 122. The cradle 102 can then be raised or lowered by operation of the height switch 112.

In view of the foregoing, the hoist 100 serves special needs required by the EMS community. In particular, the hoist 100 allows a single operator to safely and efficiently lift and transport a pressurized tank without the risk of back injury. The compact features of the hoist 100 lend to the device's maneuverability and ease of operation. Thus, a single operator can effectively remove a pressurized tank from an ambulance compartment and install a new one without assistance.

Although the invention hereof has been described by way of a preferred embodiment, it will be evident that other adaptations and modifications can be employed without departing from the spirit and scope thereof. The terms and expressions employed herein have been used as terms of description and not of limitation; and thus, there is no intent of excluding equivalents, but on the contrary it is intended to cover any and all equivalents that may be employed without departing from the spirit and scope of the invention.

I claim:

1. A hoist for lifting and transporting a pressurized tank and for assisting in stowage of the tank in a compartment of an EMS vehicle, the compartment size approximating the size of the tank, the hoist comprising:
   a base;
   a cradle for supporting the pressurized tank, the cradle having a lip and a support frame, the support frame comprising a plurality of tubular members extending from the lip and a plurality of arcuate support members coupled to the plurality of tubular members, wherein at least one tubular member comprises a movable extension member to facilitate telescopic elongation of the at least one tubular member in a vertical direction to adapt to the height of the pressurized tank when supported by the lip, wherein the cradle is no wider than the width of the pressurized tank;
   a linear actuator assembly for raising and lowering the cradle in the vertical direction, the linear actuator assembly comprising a first member coupled to the base and a movable extension member comprising at least one cantilevered support member coupling the actuator extension member to the cradle, the actuator extension member being movable in the vertical direction relative to the first member to facilitate telescopic elongation of the actuator for raising and lowering the cradle;
   a primary attachment mechanism coupled to the frame, the primary attachment mechanism comprising an adjustable strap configured to restrain the tank within the cradle;
   a back-up attachment mechanism coupled to an end of the movable extension member so that the back-up attachment mechanism is movable in the vertical direction and comprising a cable configured to retain the pressurized tank within the cradle in the event the primary attachment mechanism releases and fails to restrain the tank within the cradle; and
   wherein the movable extension member slideably moves within the at least one tubular member between a retracted position to receive the pressurized tank and an extended position, wherein to secure the pressurized tank to the cradle, the extension member is positioned in an extended position and gravitally falls from the extended position toward the retracted position to self adjust and secure the back-up attachment mechanism to the pressurized tank to facilitate rapid installation and removal of the back-up attachment mechanism.

2. The hoist of claim 1, wherein the base comprises a pair of parallel rails and a transverse rail extending between the parallel rails.

3. The hoist of claim 1, wherein the linear actuator assembly is coupled to the transverse rail.

4. The hoist of claim 1, wherein the tubular member movable extension member slidably extends relative to the at least one tubular member.

5. The hoist of claim 1, wherein the back-up attachment mechanism comprises a plastic coated steel cable.

6. The hoist of claim 1, further comprising a battery supported on the base for operating the linear actuator assembly.

7. The hoist of claim 1, wherein the primary attachment mechanism further comprises an adjustable side release buckle.

8. The hoist of claim 1, wherein linear actuator assembly is configured to lower the cradle between the base parallel rails.

9. The hoist of claim 1, further comprising a handle extending arcuately from one of the parallel rails to the other of the parallel rails.

10. The hoist of claim 1, further comprising a height switch disposed on the handle to controlling the linear actuator for raising and lowering the cradle.

11. The hoist of claim 1, wherein the plurality of arcuate support members comprise a curvature that approximates the radius of the pressurized tank.

* * * * *